US012705139B2

(12) United States Patent
Zhang et al.

(10) Patent No.: US 12,705,139 B2
(45) Date of Patent: Aug. 11, 2026

(54) METHOD, DEVICE AND COMPUTER PROGRAM PRODUCT FOR MANAGING METADATA OF FILE SYSTEM

(71) Applicant: TP-Link Systems Inc., Irvine, CA (US)

(72) Inventors: Kun Zhang, Shanghai (CN); Ziqian Liu, Shanghai (CN); Mingyi Cong, Shanghai (CN)

(73) Assignee: TP-Link Systems Inc., Irvine, CA (US)

(*) Notice: Subject to any disclaimer, the term of this patent is extended or adjusted under 35 U.S.C. 154(b) by 0 days.

(21) Appl. No.: 18/967,594

(22) Filed: Dec. 3, 2024

(65) Prior Publication Data

US 2026/0154162 A1 Jun. 4, 2026

(51) Int. Cl.
*G06F 11/14* (2026.01)
*G06F 11/1446* (2026.01)

(52) U.S. Cl.
CPC .... *G06F 11/1458* (2013.01); *G06F 2201/805* (2013.01)

(58) Field of Classification Search
CPC ....................... G06F 11/1458; G06F 2201/805
See application file for complete search history.

(56) References Cited

U.S. PATENT DOCUMENTS 9,043,280 B1 * 5/2015 Patwardhan ........ G06F 11/1435 707/640
2014/0074787 A1 * 3/2014 Berman .............. G06F 11/1469 707/639
2014/0074790 A1 * 3/2014 Berman .................. G06F 16/11 707/649
2016/0224439 A1 8/2016 Thompson

FOREIGN PATENT DOCUMENTS

CN 114936114 A 8/2022
CN 116804953 A 9/2023

OTHER PUBLICATIONS

Extended European Search Report issued in App. No. EP25212064 dated Jun. 10, 2026, 9 pages.
Hermon Rahul et al: "NTFS: Introduction and Analysis from Forensics Point of View", 2023 International Conference for Advancement in Technology (ICONAT) IEEE, Jan. 24, 2023 (Jan. 24, 2023), 6 pages, DOI: 10.1109/ICONAT57137.2023.10080271.
Nordvik Rune et al: "Generic Metadata Time Carving", Forensic Science International: Digitalinvestigation Elsevier, Amsterdam, NL, vol. 33, Jul. 1, 2020 (Jul. 1, 2020), ISSN: 2666-2817, DOI: 10.1016/J.FSIDI.2020.301005, 10 pages.
Porter Kyle et al: "Timestamp prefix carving for filesystem metadata extration", Forensic Science International: Digitalinvestigation Elsevier, Amsterdam, NL, vol. 38, Aug. 7, 2021 (Aug. 7, 2021), ISSN: 2666-2817, DOI:10.1016/J.FSIDI.2021.301266, 13 pages.

* cited by examiner

*Primary Examiner* — Loc Tran
(74) *Attorney, Agent, or Firm* — Loeb & Loeb LLP

(57) ABSTRACT

This disclosure provides a method, device and a computer program product for managing metadata of a file system. The method may include: determining a data structure of the metadata based on a type of the file system; deriving a reference value for a first field of the metadata based on the data structure of the metadata and a protocol of the file system; and overwriting the first field of the metadata with the reference value in response to an actual value of the first field of the metadata being not equal to the reference value and there being no backup for the metadata.

14 Claims, 5 Drawing Sheets

| Offset | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0C0007E00 | 46 | 49 | 4C | 45 | 30 | 00 | 03 | 00 | 05 | 3B | 26 | 1C | 00 | 00 | 00 | 00 |
| 0C0007E10 | 01 | 00 | 01 | 00 | 38 | 00 | 01 | 00 | A0 | 01 | 00 | 00 | 00 | 04 | 00 | 00 |
| 0C0007E20 | 00 | 00 | 00 | 00 | 00 | 00 | 00 | 00 | 06 | 00 | 00 | 00 | 00 | 00 | 00 | 00 |
| 0C0007E30 | BE | 00 | 00 | 00 | 00 | 00 | 00 | 00 | 10 | 00 | 00 | 00 | 60 | 00 | 00 | 00 |
| 0C0007E40 | 00 | 00 | 18 | 00 | 00 | 00 | 00 | 00 | 48 | 00 | 00 | 00 | 18 | 00 | 00 | 00 |
| 0C0007E50 | F8 | ED | FC | 1A | 0C | C1 | CE | 01 | F8 | ED | FC | 1A | 0C | C1 | CE | 01 |
| 0C0007E60 | F8 | ED | FC | 1A | 0C | C1 | CE | 01 | F8 | ED | FC | 1A | 0C | C1 | CE | 01 |
| 0C0007E70 | 06 | 00 | 00 | 00 | 00 | 00 | 00 | 00 | 00 | 00 | 00 | 00 | 00 | 00 | 00 | 00 |
| 0C0007E80 | 00 | 00 | 00 | 00 | 00 | 01 | 00 | 00 | 00 | 00 | 00 | 00 | 00 | 00 | 00 | 00 |
| 0C0007E90 | 00 | 00 | 00 | 00 | 00 | 00 | 00 | 00 | 30 | 00 | 00 | 00 | 68 | 00 | 00 | 00 |
| 0C0007EA0 | 00 | 00 | 18 | 00 | 00 | 00 | 03 | 00 | 4A | 00 | 00 | 00 | 18 | 00 | 01 | 00 |
| 0C0007EB0 | 05 | 00 | 00 | 00 | 00 | 00 | 05 | 00 | F8 | ED | FC | 1A | 0C | C1 | CE | 01 |
| 0C0007EC0 | F8 | ED | FC | 1A | 0C | C1 | CE | 01 | F8 | ED | FC | 1A | 0C | C1 | CE | 01 |
| 0C0007ED0 | F8 | ED | FC | 1A | 0C | C1 | CE | 01 | 00 | 40 | 00 | 00 | 00 | 00 | 00 | 00 |
| 0C0007EE0 | 00 | 40 | 00 | 00 | 00 | 00 | 00 | 00 | 06 | 00 | 00 | 00 | 00 | 00 | 00 | 00 |
| 0C0007EF0 | 04 | 03 | 24 | 00 | 4D | 00 | 46 | 00 | 54 | 00 | 00 | 00 | 00 | 00 | 00 | 00 |
| 0C0007F00 | 80 | 00 | 00 | 00 | 48 | 00 | 00 | 00 | 01 | 00 | 40 | 00 | 00 | 00 | 01 | 00 |
| 0C0007F10 | 00 | 00 | 00 | 00 | 00 | 00 | 00 | 00 | C7 | 26 | 00 | 00 | 00 | 00 | 00 | 00 |
| 0C0007F20 | 40 | 00 | 00 | 00 | 00 | 00 | 00 | 00 | 00 | 80 | 6C | 02 | 00 | 00 | 00 | 00 |
| 0C0007F30 | 00 | 80 | 6C | 02 | 00 | 00 | 00 | 00 | 00 | 80 | 6C | 02 | 00 | 00 | 00 | 00 |
| 0C0007F40 | 32 | C8 | 26 | 00 | 00 | 0C | 00 | 00 | B0 | 00 | 00 | 00 | 50 | 00 | 00 | 00 |
| 0C0007F50 | 01 | 00 | 40 | 00 | 00 | 00 | 05 | 00 | 00 | 00 | 00 | 00 | 00 | 00 | 00 | 00 |
| 0C0007F60 | 01 | 00 | 00 | 00 | 00 | 00 | 00 | 00 | 40 | 00 | 00 | 00 | 00 | 00 | 00 | 00 |
| 0C0007F70 | 00 | 20 | 00 | 00 | 00 | 00 | 00 | 00 | 68 | 13 | 00 | 00 | 00 | 00 | 00 | 00 |
| 0C0007F80 | 68 | 13 | 00 | 00 | 00 | 00 | 00 | 00 | 31 | 01 | 57 | FF | 1F | 31 | 01 | 9C |
| 0C0007F90 | 73 | EA | 00 | E1 | 78 | D2 | ED | F3 | FF | FF | FF | FF | 00 | 00 | 00 | 00 |
| 0C0007FA0 | 00 | 80 | 00 | 00 | 00 | 00 | 00 | 00 | 31 | 08 | 00 | 00 | 0C | 00 | 01 | 00 |
| 0C0007FB0 | B0 | 00 | 00 | 00 | 48 | 00 | 00 | 00 | 01 | 00 | 40 | 00 | 00 | 00 | 05 | 00 |
| 0C0007FC0 | 00 | 00 | 00 | 00 | 00 | 00 | 00 | 00 | 00 | 00 | 00 | 00 | 00 | 00 | 00 | 00 |
| 0C0007FD0 | 40 | 00 | 00 | 00 | 00 | 00 | 00 | 00 | 00 | 10 | 00 | 00 | 00 | 00 | 00 | 00 |
| 0C0007FE0 | 08 | 00 | 00 | 00 | 00 | 00 | 00 | 00 | 08 | 00 | 00 | 00 | 00 | 00 | 00 | 00 |
| 0C0007FF0 | 31 | 01 | FF | FF | 0B | 00 | 00 | 00 | FF | FF | FF | FF | 00 | 00 | BE | 00 |

| Offset | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0C0007E00 | 46 | 49 | 4C | 45 | 30 | 00 | 03 | 00 | 05 | 3B | 26 | 1C | 00 | 00 | 00 | 00 |
| 0C0007E10 | 01 | 00 | 01 | 00 | 38 | 00 | 01 | 00 | A0 | 01 | 00 | 00 | 00 | 04 | 00 | 00 |
| 0C0007E20 | 00 | 00 | 00 | 00 | 00 | 00 | 00 | 00 | 06 | 00 | 00 | 00 | 00 | 00 | 00 | 00 |
| 0C0007E30 | BE | 00 | 00 | 00 | 00 | 00 | 00 | 00 | 10 | 00 | 00 | 00 | 60 | 00 | 00 | 00 |
| 0C0007E40 | 00 | 00 | 18 | 00 | 00 | 00 | 00 | 00 | 48 | 00 | 00 | 00 | 18 | 00 | 00 | 00 |
| 0C0007E50 | F8 | ED | FC | 1A | 0C | C1 | CE | 01 | F8 | ED | FC | 1A | 0C | C1 | CE | 01 |
| 0C0007E60 | F8 | ED | FC | 1A | 0C | C1 | CE | 01 | F8 | ED | FC | 1A | 0C | C1 | CE | 01 |
| 0C0007E70 | 06 | 00 | 00 | 00 | 00 | 00 | 00 | 00 | 00 | 00 | 00 | 00 | 00 | 00 | 00 | 00 |
| 0C0007E80 | 00 | 00 | 00 | 00 | 00 | 01 | 00 | 00 | 00 | 00 | 00 | 00 | 00 | [illegible] | 00 | 00 |
| 0C0007E90 | 00 | 00 | 00 | 00 | 00 | 00 | 00 | 00 | 30 | 00 | 00 | 00 | 68 | 00 | [illegible] | 00 |
| 0C0007EA0 | 00 | 00 | 18 | 00 | 00 | 00 | 03 | 00 | 4A | 00 | 00 | 00 | 18 | 00 | 01 | [illegible] |
| 0C0007EB0 | 05 | 00 | 00 | 00 | 00 | 00 | 05 | 00 | F8 | ED | FC | 1A | 0C | C1 | CE | 01 |
| 0C0007EC0 | F8 | ED | FC | 1A | 0C | C1 | CE | 01 | F8 | ED | FC | 1A | 0C | C1 | CE | 01 |
| 0C0007ED0 | F8 | ED | FC | 1A | 0C | C1 | CE | 01 | 00 | 40 | 00 | 00 | 00 | 00 | 00 | 00 |
| 0C0007EE0 | 00 | 40 | 00 | 00 | 00 | 00 | 00 | 00 | 06 | 00 | 00 | 00 | 00 | 00 | 00 | 00 |
| 0C0007EF0 | 04 | 03 | 24 | 00 | 4D | 00 | 46 | 00 | 54 | 00 | 00 | 00 | 00 | 00 | 00 | 00 |
| 0C0007F00 | 80 | 00 | 00 | 00 | 48 | 00 | 00 | 00 | 01 | 00 | 40 | 00 | 00 | 00 | 01 | 00 |
| 0C0007F10 | 00 | 00 | 00 | 00 | 00 | 00 | 00 | 00 | C7 | 26 | 00 | 00 | 00 | 00 | 00 | 00 |
| 0C0007F20 | 40 | 00 | 00 | 00 | 00 | 00 | 00 | 00 | 00 | 80 | 6C | 02 | 00 | 00 | 00 | 00 |
| 0C0007F30 | 00 | 80 | 6C | 02 | 00 | 00 | 00 | 00 | 00 | 80 | 6C | 02 | 00 | 00 | 00 | 00 |
| 0C0007F40 | 32 | C8 | 26 | 00 | 00 | 0C | 00 | 00 | B0 | 00 | 00 | 00 | 50 | 00 | 00 | 00 |
| 0C0007F50 | 01 | 00 | 40 | 00 | 00 | 00 | 05 | 00 | 00 | 00 | 00 | 00 | 00 | 00 | 00 | 00 |
| 0C0007F60 | 01 | 00 | 00 | 00 | 00 | 00 | 00 | 00 | 40 | 00 | 00 | 00 | 00 | 00 | 00 | 00 |
| 0C0007F70 | 00 | 20 | 00 | 00 | 00 | 00 | 00 | 00 | 68 | 13 | 00 | 00 | 00 | 00 | 00 | 00 |
| 0C0007F80 | 68 | 13 | 00 | 00 | 00 | 00 | 00 | 00 | 31 | 01 | 57 | FF | 1F | 31 | 01 | 9C |
| 0C0007F90 | 73 | EA | 00 | E1 | 78 | D2 | ED | F3 | FF | FF | FF | FF | 00 | 00 | 00 | 00 |
| 0C0007FA0 | 00 | 80 | 00 | 00 | 00 | 00 | 00 | 00 | 31 | 08 | 00 | 00 | 0C | 00 | 01 | 00 |
| 0C0007FB0 | B0 | 00 | 00 | 00 | 48 | 00 | 00 | 00 | 01 | 00 | 40 | 00 | 00 | 00 | 05 | 00 |
| 0C0007FC0 | 00 | 00 | 00 | 00 | 00 | 00 | 00 | 00 | 00 | 00 | 00 | 00 | 00 | 00 | 00 | 00 |
| 0C0007FD0 | 40 | 00 | 00 | 00 | 00 | 00 | 00 | 00 | 00 | 10 | 00 | 00 | 00 | 00 | 00 | 00 |
| 0C0007FE0 | 08 | 00 | 00 | 00 | 00 | 00 | 00 | 00 | 08 | 00 | 00 | 00 | 00 | 00 | 00 | 00 |
| 0C0007FF0 | 31 | 01 | FF | FF | 0B | 00 | 00 | 00 | FF | FF | FF | FF | 00 | 00 | BE | 00 |

| Boot sector | Reserved sectors | FAT1 | FAT2(duplicate) | Data |
|---|---|---|---|---|

METHOD, DEVICE AND COMPUTER PROGRAM PRODUCT FOR MANAGING METADATA OF FILE SYSTEM

TECHNICAL FIELD

The present disclosure relates to the field of file system, and more specifically, to a method, device and a computer program product for managing metadata of a file system.

BACKGROUND

A file system is a subsystem in an operating system that is responsible for managing persistent data. Its purpose is to organize and manage files on the disk. Different ways of organization will lead to different file systems.

File systems usually include data and metadata. Data refers to information that is actually stored in the file system, such as document content, pictures, videos, program codes, etc., which are created, edited and used directly by users. In the file system, data usually exists in the form of files, and each file has its own data content. Metadata is information that describes the characteristics, attributes and states of data. It provides detailed information about the context and structure of data, and helps the file system to manage, locate and maintain data.

In practical use scenarios, improper human operation, hardware damage, or malicious attacks may lead to data corruption of the file system, of which metadata corruption is particularly serious, leading to the failure of the entire file system to be mounted.

SUMMARY

The present disclosure provides techniques for recovering metadata of a file system from corruption efficiently. In particular, the present disclosure provides a method, device and a computer program product for managing metadata of a file system. Through the techniques described herein, metadata of the file system that is corrupted or damaged may be identified automatically, and may be overwritten with derived reference values without the requirement of a backup of the metadata. Therefore, more metadata that suffers from corruption may be recovered and the robustness of the file system may be enhanced.

According to an aspect of the present disclosure, there is provided a method for managing metadata of a file system. The method can comprise: determining a data structure of the metadata based on a type of the file system; deriving a reference value for a first field of the metadata based on the data structure of the metadata and a protocol of the file system; and overwriting the first field of the metadata with the reference value in response to an actual value of the first field of the metadata being not equal to the reference value and there being no backup for the metadata.

In some embodiments, the method may further comprise: in response to an actual value of the first field of the metadata being not equal to the reference value and there being a backup for the metadata, overwriting the metadata with the backup.

In some embodiments, overwriting the metadata with the backup can comprise: overwriting all fields of the metadata with the backup in response to a value of a first field of the backup being equal to the reference value.

In some embodiments, overwriting the metadata with the backup can comprise: in response to a value of a first field of the backup being not equal to the reference value, overwriting the first field of the metadata with the reference value and overwriting the other fields of the metadata with the backup.

In some embodiments, overwriting the metadata with the backup can comprise: overwriting all fields of the metadata with the backup; and in response to a value of a first field of the backup being not equal to the reference value, overwriting the first field of the metadata with the reference value.

In some embodiments, the method may further comprise: deriving a reference value range for a second field of the metadata based on the data structure of the metadata and the protocol of the file system; and in response to an actual value of the second field of the metadata not falling within the reference value range and there being a backup for the metadata, overwriting the metadata with the backup.

In some embodiments, the file system may be a new technology file system (NTFS), the data structure of the metadata can comprise a record header and a record body, the record body can comprise one or more attributes, and each attribute can comprise an attribute header and an attribute body.

According to another aspect of the present disclosure, there is provided a device for managing metadata of a file system. The device can comprise one or more processors; a memory coupled to at least one of the processors; and a set of computer program instructions stored in the memory. The set of computer program instructions, when executed by at least one of the processors, can perform actions of: determining a data structure of the metadata based on a type of the file system; deriving a reference value for a first field of the metadata based on the data structure of the metadata and a protocol of the file system; and overwriting the first field of the metadata with the reference value in response to an actual value of the first field of the metadata being not equal to the reference value and there being no backup for the metadata.

In some embodiments, the set of computer program instructions, when executed by at least one of the processors, may further be configured to perform actions of: in response to an actual value of the first field of the metadata being not equal to the reference value and there being a backup for the metadata, overwriting the metadata with the backup.

In some embodiments, overwriting the metadata with the backup can comprise: overwriting all fields of the metadata with the backup in response to a value of a first field of the backup being equal to the reference value.

In some embodiments, overwriting the metadata with the backup can comprise: in response to a value of a first field of the backup being not equal to the reference value, overwriting the first field of the metadata with the reference value and overwriting the other fields of the metadata with the backup.

In some embodiments, overwriting the metadata with the backup can comprise: overwriting all fields of the metadata with the backup; and in response to a value of a first field of the backup being not equal to the reference value, overwriting the first field of the metadata with the reference value.

In some embodiments, the set of computer program instructions, when executed by at least one of the processors, may further be configured to perform actions of: deriving a reference value range for a second field of the metadata based on the data structure of the metadata and the protocol of the file system; and in response to an actual value of the second field of the metadata not falling within the reference value range and there being a backup for the metadata, overwriting the metadata with the backup.

In some embodiments, the file system may be a new technology file system (NTFS), the data structure of the metadata can comprise a record header and a record body, the record body can comprise one or more attributes, and each attribute can comprise an attribute header and an attribute body.

According to yet another aspect of the present disclosure, there is provided a computer program product for managing metadata of a file system. The computer program product can comprise a non-transitory computer readable storage medium having program instructions embodied therewith. The program instructions, when executed by a processor, can cause the processor to: determine a data structure of the metadata based on a type of the file system; derive a reference value for a first field of the metadata based on the data structure of the metadata and a protocol of the file system; and overwrite the first field of the metadata with the reference value in response to an actual value of the first field of the metadata being not equal to the reference value and there being no backup for the metadata.

In some embodiments, the program instructions may further be configured to cause the processor to: in response to an actual value of the first field of the metadata being not equal to the reference value and there being a backup for the metadata, overwrite the metadata with the backup.

In some embodiments, overwriting the metadata with the backup can comprise: overwriting all fields of the metadata with the backup in response to a value of a first field of the backup being equal to the reference value.

In some embodiments, overwriting the metadata with the backup can comprise: in response to a value of a first field of the backup being not equal to the reference value, overwriting the first field of the metadata with the reference value and overwriting the other fields of the metadata with the backup.

In some embodiments, overwriting the metadata with the backup can comprise: overwriting all fields of the metadata with the backup; and in response to a value of a first field of the backup being not equal to the reference value, overwriting the first field of the metadata with the reference value.

In some embodiments, the program instructions may further be configured to cause the processor to: derive a reference value range for a second field of the metadata based on the data structure of the metadata and the protocol of the file system; and in response to an actual value of the second field of the metadata not falling within the reference value range and there being a backup for the metadata, overwrite the metadata with the backup.

In some embodiments, the file system may be a new technology file system (NTFS), the data structure of the metadata can comprise a record header and a record body, the record body can comprise one or more attributes, and each attribute can comprise an attribute header and an attribute body.

At least based on the above embodiments of the present disclosure, metadata of the file system that is corrupted or damaged may be identified automatically, and may be overwritten with derived reference values without the requirement of a backup of the metadata. In this way, the range of metadata that may be recovered from corruption is expanded and the robustness of the file system may be enhanced, thus improving user experience. The techniques described herein may be applied to any file system and corresponding metadata in metadata area of the file system. In addition, the techniques described herein may be used together with the existing methods for recovering the boot area of the file system, so that not only the boot area but also the metadata area may be recovered or restored.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements.

DETAILED DESCRIPTION

Figure 1:
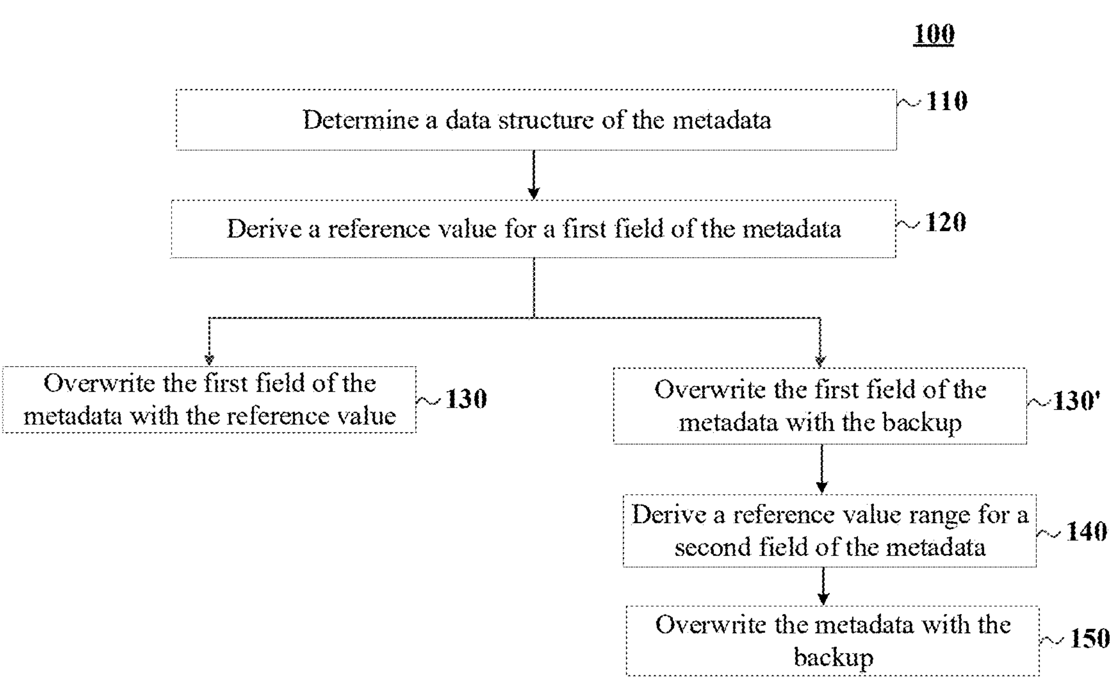
FIG. 1 illustrates a flowchart of a method for managing metadata of a file system according to an embodiment of the present disclosure.

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that terms such as “first”, “second” and “third” are only for descriptive purposes, whereas cannot be understood as indicating or implying relative importance. Likewise, words like “a”, “an” or “the” do not represent a quantity limit, but represent an existence of at least one. Words like “include” or “comprise” mean that an element or an object in front of said word encompasses those ones listed following the said word and their equivalents, without excluding other elements or objects.

In addition, technical features involved in different embodiments of the present disclosure described below may be combined with each other as long as no conflicts occur therebetween.

As described above, metadata of a file system may be corrupted due to various reasons such as improper human operation, hardware damage, or malicious attacks. Metadata corruption may cause the file system to fail to mount normally. Solving the problem of metadata corruption of the file system usually requires the use of professional file system repair tools and a backup of the metadata. Not all metadata has a backup, and it may not be necessary to prepare a backup for all the metadata. However, currently, metadata usually cannot be recovered without the help of a backup. Besides, the backup itself may also be corrupted or go wrong. In addition, some methods deal with the recovery of boot area of the file system with a backup of the boot area or through traversing the disk and regenerating parameters or data of the boot area, but these methods cannot apply to the metadata area of the file system. Lack of correct metadata will lead to a series of problems, such as inefficient file system, reduced security and the entire file system may not be mounted.

In view of the above problems, the present disclosure provides method, device and a computer program product for managing metadata of a file system. Through the techniques described herein, metadata of the file system that is corrupted or damaged may be identified automatically, and may be overwritten with derived reference values without the requirement of a backup of the metadata. In this way, metadata that may be recovered is not restricted to metadata that has a backup. Therefore, the range of metadata that may be recovered is expanded and the robustness of the file system may be enhanced, thus improving user experience. The techniques described herein may be applied to any file system and corresponding metadata in metadata area of the file system. In addition, the techniques described herein may be used together with the existing methods for recovering the boot area of the file system, so that not only the boot area but also the metadata area may be recovered or restored.

The following descriptions will be made with reference to FIG. 1. It is shown a flowchart of a method 100 for managing metadata of a file system according to an embodiment of the present disclosure. The method 100 in FIG. 1 may be performed by a processor.

At step 110, a data structure of the metadata may be determined based on a type of the file system. Different file systems use different ways to organize data and files. For a specific file system, the data structure of metadata is fixed. Therefore, once the type of the file system is determined, the way the data and files are organized may be determined, that is, the data structure of the metadata of the file system may be determined.

Taking the NTFS (new technology file system) as an example, Table 1 below is a list of the 16 metadata, also called metafiles, of the NTFS and their corresponding functions are also indicated in Table 1. Each of the 16 metadata is responsible for some aspects of the system operation. The metafiles are in the NTFS disk root directory, they start with a name character "$".

TABLE 1

| Number | Name | Description |
|---|---|---|
| 1 | $MFT | The $MFT tells us where all the pieces of MFT (Master File Table) are |
| 2 | $MFTMirr | Copy of the first 16 MFT records placed in the middle of the disk |
| 3 | $LogFile | A journal of the NTFS's metadata transaction |
| 4 | $Volume | It keeps record of the NTFS version, volume information, and the volume label, etc. |
| 5 | $AttrDef | List of different attributes that the file system can have |
| 6 | $Root | Root directory |
| 7 | $Bitmap | Volume free space bitmap |
| 8 | $Boot | Boot sector (bootable partition) |
| 9 | $BadClus | Record of the clusters that contain physically bad sectors |
| 10 | $Secure | Security information |
| 11 | $Upcase | Table of accordance between capital and small letters in files names on current volume |
| 12 | $Extended metadata directory | Extended metadata directory |

TABLE 1-continued

| Number | Name | Description |
|---|---|---|
| 13 | $Extend/ $Reparse | Reparse point files |
| 14 | $Extend/ $UsnJrnl | Record of change log files |
| 15 | $Extend/ $Quota | Record of quota management files |
| 16 | $Extend/ $ObjId | Record of object ID files |

Figure 2:
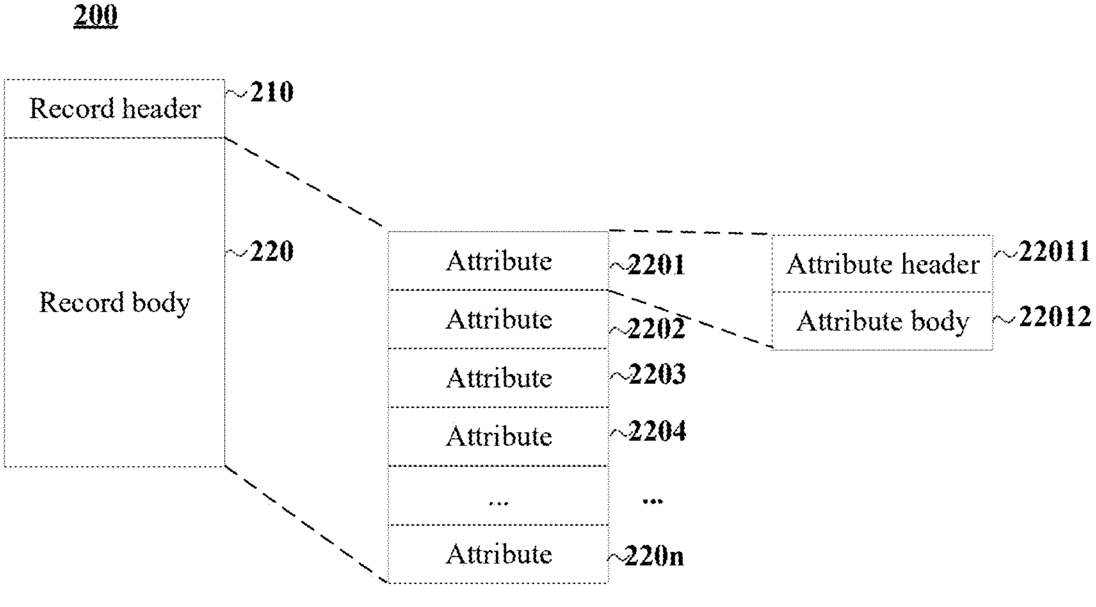
FIG. 2 illustrates an exemplary structure of a file record in NTFS.

In the file system of NTFS, all the data, including metadata, is stored on the disk in the form of files. Each file includes one or more file records. FIG. 2 illustrates an exemplary structure of a file record in NTFS. As shown in FIG. 2, a file record consists of a record header 210 and a record body 220. That is, the data structure of the metadata of NTFS includes a record header 210 and a record body 220. Each record body 220 includes one or more attributes, shown as attributes 2201 to **220*n* in FIG. 2, and n represents an integer. Further, each of the attributes 2201 to 220*n* includes an attribute header (such as attribute header 22011 for attribute 2201) and an attribute body (such as attribute body 22012 for attribute 2201**).

Figure 3:
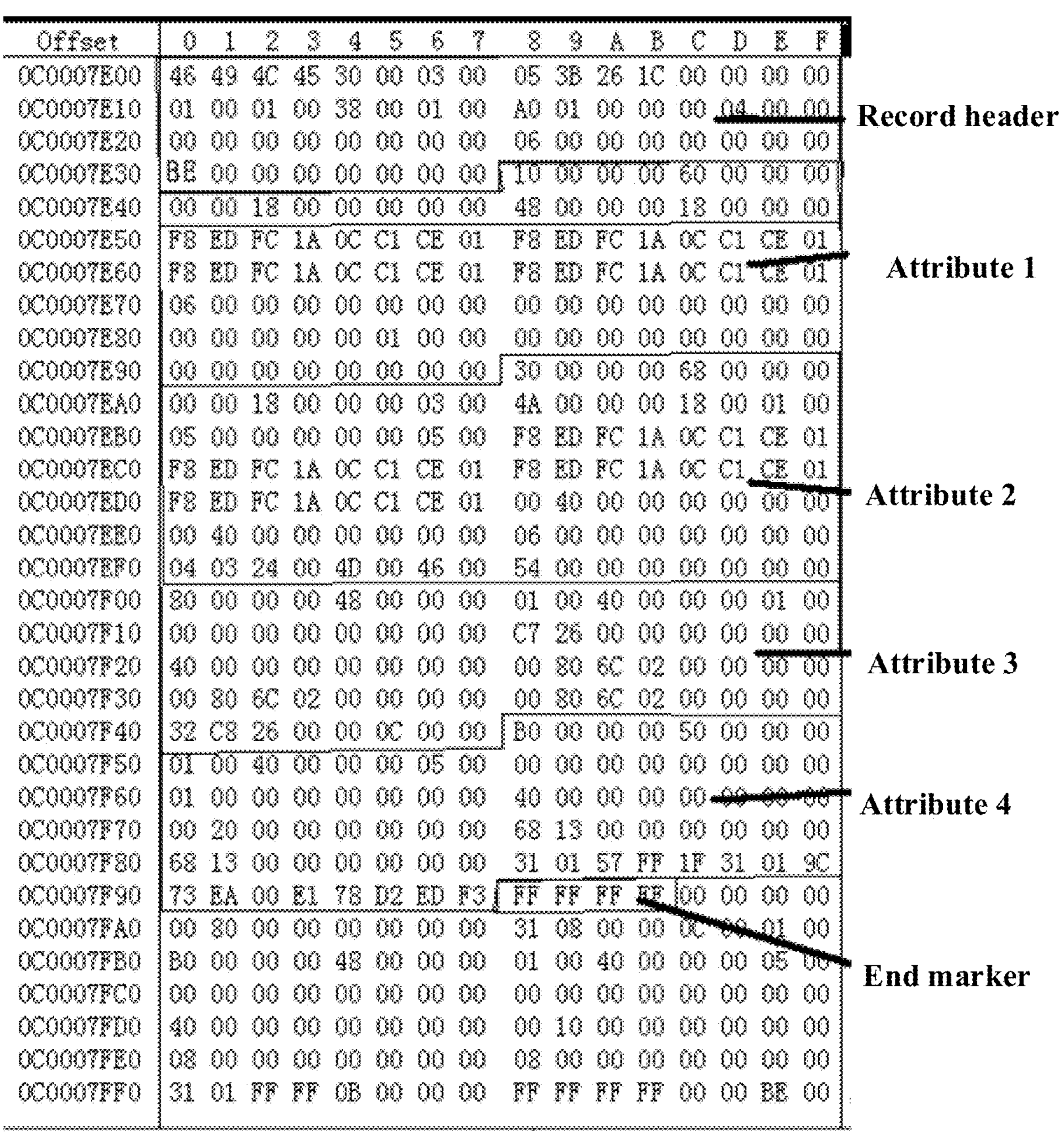
FIG. 3 illustrates an exemplary complete file record in NTFS.
Figures 4, 5:
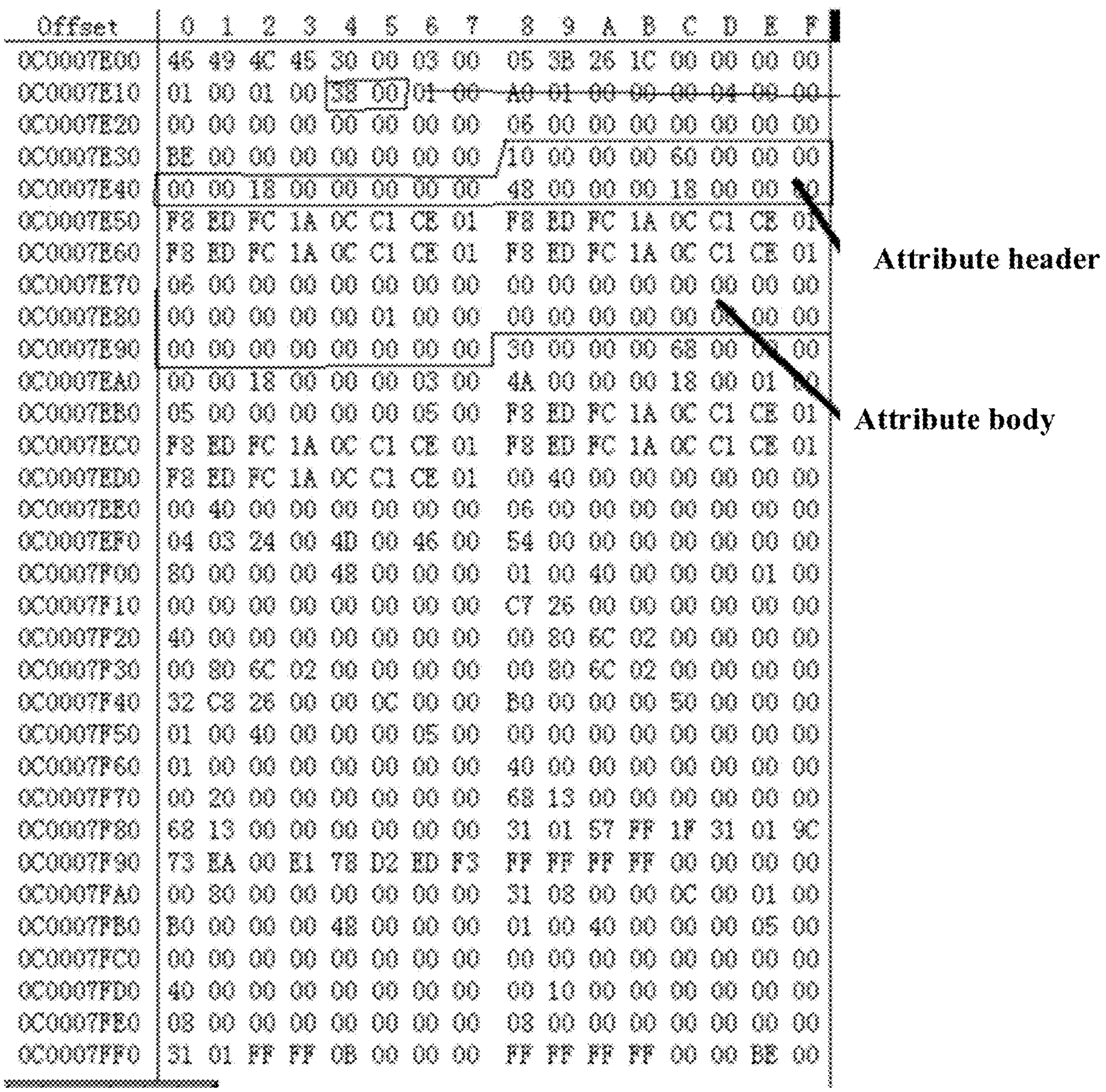
FIG. 4 illustrates an exemplary structure of an attribute of a file record in NTFS.
FIG. 5 illustrates an organization of a FAT32 file system.

FIG. 3 illustrates an exemplary complete file record in NTFS. As shown in FIG. 3, the file record includes a record header and 4 attributes, the 4 attributes consist of a record body. FIG. 3 also shows the end marker of the file record. FIG. 4 illustrates an exemplary structure of an attribute of a file record in NTFS. As shown in FIG. 4, the attribute includes an attribute header and an attribute body.

Take the FAT32 (File Allocation Table 32) file system as another example. FIG. 5 illustrates an organization of a FAT32 file system, which includes a boot sector, reserved sectors, FAT1, FAT2 and data. Taking the boot sector as an example of the metadata described herein, its respective portions are described in Table 2 below.

TABLE 2

| Offset (bytes) | Length (bytes) | Portions |
|---|---|---|
| 0X00 | 3 | Jump instruction |
| 0X03 | 8 | OEM ID |
| 0X0B | 53 | BPB (BIOS Parameter Block) |
| 0X40 | 26 | Extended BPB |
| 0X5A | 420 | Bootstrap code |
| 0X01FE | 2 | End of sector marker |

From the above examples shown in FIGS. 2-5, Table 1 and 2, it may be seen that once the type of the file system is determined, the data structure of metadata of the file system may be determined. It should be noted that although different metadata in the same file system may have a common data structure, the details may be different. For example, metadata $MFT and $Volume in the NTFS both include a record header and a record body respectively, but the number of attributes in the record body of $MFT and $Volume are different. Nevertheless, the data structure of any particular metadata may be determined.

At step 120, a reference value for a first field of the metadata may be derived based on the data structure of the metadata and a protocol of the file system. It should be noted that term "first" mentioned herein is only for descriptive purposes, and is meant to indicate any field of the metadata. As stated above, one piece of metadata has a fixed data structure specific to that metadata, and the data structure may have a plurality of portions, such as the record header, the attribute header and the attribute body described with respect to NTFS and the BPB and extended BPB described with respect to FAT32. Each of the plurality of portions may be consisted of a plurality of fields. The protocol of a specific file system may define various fields of each portion of the data structure, and some of the fields may have a predefined value or value range. The predefined value of a field of the metadata may be used as a reference value for the field, and may be derived based on the data structure of the metadata and the protocol of the file system.

Table 3 below illustrates some of the fields of a record header of the metadata of NTFS. As may be seen from Table 3 and also FIG. 3, the field at offset 0X00 and with a length of 4 bytes has a predefined value of 0X46494C45, i.e., character string "FILE". In addition, some fields, such as the field at offset 0X04 and with a length of 2 bytes which describes an offset of the update sequence number, and the field at offset 0X14 and with a length of 2 bytes which describes an offset of the first attribute, may have a predefined value or value range for each specific metadata of NTFS defined by the corresponding protocol of NTFS.

TABLE 3

| Offset(bytes) | Length (bytes) | Field description |
|---|---|---|
| 0X00 | 4 | Fixed value "FILE" |
| 0X04 | 2 | USN (Update Sequence Number) offset |
| 0X06 | 2 | USN size |
| 0X08 | 8 | Log sequence number |
| 0X10 | 2 | Sequence number |
| 0X12 | 2 | Link number |
| 0X14 | 2 | First attribute offset |
| . . . | . . . | . . . |

Similarly, with respect to an attribute header and/or an attribute body of an attribute in a record body of any metadata of NTFS, there are also tables corresponding to various fields of the attribute header and/or the attribute body. Likewise, some fields, such as the field which describes a name of the attribute, the field which describes an offset of the attribute body, and the field which describes whether the attribute is a resident attribute or not, may have a predefined value or value range defined by the corresponding protocol of NTFS.

Table 4 below illustrates some of the fields of the portion "BPB" (as shown in Table 2) of the metadata "boot sector" of the FAT32 file system. As may be seen from Table 4, the field at offset 0X11 and with a length of 2 bytes which describe root entries must be set to 0, which means that it has a predefined value of 0. Similarly, the fields at offset 0X13 and 0X16 also have a predefined value of 0 respectively, and the field at offset 0X52 has a predefined value of "FAT32".

TABLE 4

| Offset (bytes) | Length (bytes) | Field description |
|---|---|---|
| 0X0B | 2 | Bytes per sector |
| 0X0D | 1 | Sectors per cluster |
| 0X0E | 2 | Reserved sector |
| 0X10 | 1 | Number of FAT, the value of this field is generally 2 |
| 0X11 | 2 | Root entries, this field must be set to 0 for FAT32 partition |
| 0X13 | 2 | Small sector, this field must be set to 0 for FAT32 partition |
| 0X15 | 1 | Media descriptor |
| 0X16 | 2 | Sectors per FAT, this field must be set to 0 for FAT32 partition |
| . . . | . . . | . . . |
| 0X52 | 8 | System ID, set to "FAT32" for FAT32 file system |

In the above examples shown in Tables 3 and 4, the predefined value of a specific field, such as the value "FILE", "FAT32" and 0 described above, may be used as a reference value for the corresponding field, and may be derived once the data structure of the metadata and the protocol of the file system is determined.

It should be noted that the NTFS and FAT32 mentioned above are only examples of file systems. Although the above embodiments are described with respect to NTFS and FAT32, the method for managing metadata according to embodiments of the present disclosure may be applied to any file system and metadata of the file system, as long as data structure of the metadata in the file system has a specified format and a reference value of a field of the metadata may be derived.

Figure 6:
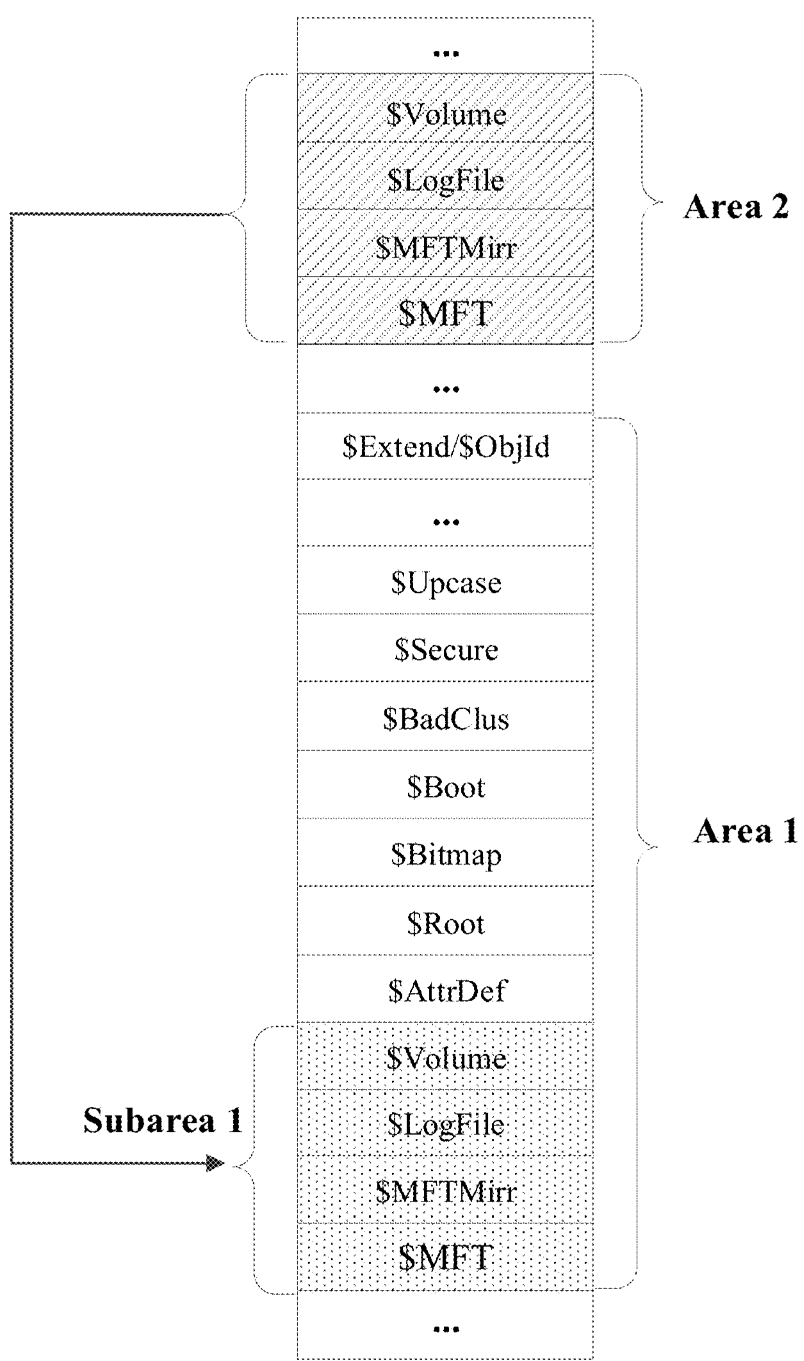
FIG. 6 illustrates an exemplary diagram of areas of NTFS.

Continuing with the embodiment in FIG. 1. Since the derived reference value of the first field is what is required by the data structure and the protocol of the specific file system and thus represents a "correct" value for the first field, the derived reference value of the first field may be further used to check whether the current metadata is corrupted or incorrect. Specifically, an actual value of the first field of the metadata may be compared with the derived reference value of the first field, and if they are not equal, it may be determined that the metadata goes wrong. In some cases, there may be a backup for the metadata. However, there may not be backup for all the metadata of a file system. FIG. 6 illustrates an exemplary diagram of areas of NTFS. As shown in FIG. 6, the metadata shown in Table 1 is in area 1, and area 2 provides backup for some of the metadata in area 1. For example, the metadata $MFT, $MFTMirr, $LogFile and $Volume, as shown in Table 1 and shown in FIG. 6 in blocks with dots in subarea 1, may have a backup in area 2 (shown in FIG. 6 as blocks with slashes) respectively, while other metadata such as $Bitmap and $Root as shown in Table 1 and FIG. 6 may not have a backup. The present disclosure aims to try to recover the corrupted metadata even without the help of a backup, that is, the present disclosure not only can recover or restore the metadata that has a backup (such as the metadata $MFT, $MFTMirr, $LogFile and $Volume), but also can recover or restore the metadata that does not have a backup (such as the metadata $Bitmap, $AttrDef and $Upcase). The range of metadata that may be recovered is expanded beyond the range such as subarea 1 shown in FIG. 6 to the whole range of metadata area such as area 1 shown in FIG. 6.

As described above, the derived reference value of the first field represents a "correct" value for the first field, and therefore it may be used to recover the corrupted metadata, in particular the corrupted first field of the metadata, without the use of a backup. Therefore, at step 130, in response to an actual value of the first field of the metadata being not equal to the reference value and there being no backup for the metadata, the first field of the metadata may be overwritten with the reference value. In this way, the first field of the metadata which is corrupted or incorrect, can now be identified automatically and overwritten with a correct value, and the metadata may be recovered from corruption, so that the file system may be correctly mounted. As there is no need for the backup of the metadata, the range of metadata that may be recovered is expanded beyond the metadata that has a backup, and the robustness of the file system may be enhanced, thus improving user experience.

On the other hand, as for the metadata that does have a backup, we can also use the backup in the recovery of the metadata to improve the efficiency. This is because that one or more fields of the metadata may be corrupted, but not all the fields of the metadata can have a reference value that may be derived, and the backup for the metadata may have corresponding values for all the fields of the metadata, which may be a better choice for recovering the metadata. Therefore, in some embodiments, as an alternative, if it is determined that the current metadata is corrupted or incorrect based on the actual value of the first field of the metadata being not equal to the reference value and there is a backup for the metadata, the metadata may be overwritten with the backup. That is, as shown in FIG. 1, at step 130', in response to an actual value of the first field of the metadata being not equal to the reference value and there being a backup for the metadata, the metadata may be overwritten with the backup. In this way, the reference value of the first field may be used to check whether the metadata is corrupted, and if it is determined that the metadata is corrupted and there is a backup for the metadata, instead of only overwriting the first field of the metadata, the other fields of the metadata may also be overwritten with corresponding fields in the backup, improving efficiency.

The backup itself or one or more fields in the backup may also be corrupted or incorrect. In this case, overwriting the whole metadata with the backup may not recover the metadata completely. As described above, the derived reference value of the first field represents a "correct" value for the first field, and therefore it can also be used to check whether the backup, in particular the corresponding first field in the backup, is corrupted or incorrect. This may be done through comparing the value of the first field of the backup with the reference value derived at step 120. Further, if the first field in the backup is determined to be correct, that is, the value of the first field of the backup is equal to the reference value derived at step 120, we may assume that the whole backup is correct and not corrupted, and may be used to overwrite the metadata. Therefore, in some embodiments, step 130' may include overwriting all fields of the metadata with the backup in response to a value of a first field of the backup being equal to the reference value. In this way, the correctness of the backup may be verified before being used to the whole metadata.

On the other hand, if the first field in the backup is determined to be corrupted or incorrect, that is, the value of the first field of the backup is not equal to the reference value derived at step 120, the backup cannot be used to overwrite the whole metadata. In this case, the first field of the backup may be dropped and the reference value derived at step 120 may be used to overwrite the first field of the metadata, while for the other fields of the metadata, we can still have a try with the backup for overwriting, assuming that the other fields of the backup except the first field may be correct. Therefore, in some embodiments, step 130' may include overwriting the first field of the metadata with the reference value and overwriting the other fields of the metadata with the backup, in response to a value of a first field of the backup being not equal to the reference value.

Instead of verifying the correctness of the backup before using the backup, we may directly use the backup for metadata recovery and make modification later if a corruption or incorrectness in the backup is found. Therefore, in some embodiments, step 130' may include firstly overwriting all fields of the metadata with the backup, and then, in response to a value of a first field of the backup being not equal to the reference value, which means that the first field of the backup is corrupted or incorrect, overwriting the first field of the metadata with the reference value, which represents a "correct" value for the first field. In this way, the backup may be used directly and immediately for overwriting the metadata, which means that the metadata can recover quickly from corruption, and thus improving user experience. Moreover, if there is a corruption or incorrectness in the first field of the backup, the first field of the metadata can still be recovered through using the derived reference value.

As described above, some of the fields of the metadata may have a predefined value range but not a specific value. In this case, not a reference value, but a reference value range may be derived based on the data structure of the metadata and the protocol of the file system. Although the derived reference range cannot be used directly to overwrite the corresponding field of the metadata, it may be used to determine whether the metadata is corrupted or incorrect. Further, if there is a backup for the metadata, and it is determined based on the derived reference range that the metadata is corrupted or incorrect, the metadata may be overwritten with the backup. Therefore, in some embodiments, the method 100 may further includes steps 140 and 150. At step 140, similar to step 120, a reference value range for a second field of the metadata may be derived based on the data structure of the metadata and the protocol of the file system. At step 150, the metadata may be overwritten with the backup in response to an actual value of the second field of the metadata not falling within the reference value range and there being a backup for the metadata.

It should be appreciated that although steps 140 and 150 are shown as after step 130' in FIG. 1, they can also be after step 120 or 130, or be in parallel with steps 120, 130 or 130'. It should also be noted that term "second" mentioned herein is only for descriptive purposes, and is meant to indicate any field of the metadata.

Inventors of the present disclosure has conducted an experiment to test performance of the method for managing metadata according to embodiments of the present disclosure under NTFS. In the experiment, metadata from number 1 to number 11 in Table 1 is corrupted, with one field corrupted at a time, and a total of 1292 fields are corrupted. After each corruption, a functional test on the file system is performed to see if it can still work normally. The corruption of each of a total of 407 fields leads to the NTFS not working normal before applying the method for managing metadata according to embodiments of the present disclosure. In contrast, the corruption of each of a total of 147 fields leads to the NTFS not working normal after applying the method for managing metadata according to embodiments of the present disclosure. As a result, recovering rate of metadata increases by (407−147)/1292=20.1% through the method for managing metadata according to embodiments of the present disclosure, which indicates that the range of metadata that may be recovered is expanded through the method for managing metadata according to embodiments of the present disclosure.

It should be noted that although the above embodiments are described with respect to NTFS and FAT32, the method for managing metadata according to embodiments of the present disclosure may be applied to any file system and metadata of the file system, as long as data structure of the metadata in the file system has a specified format and a reference value of a field of the metadata may be derived.

Figure 7:
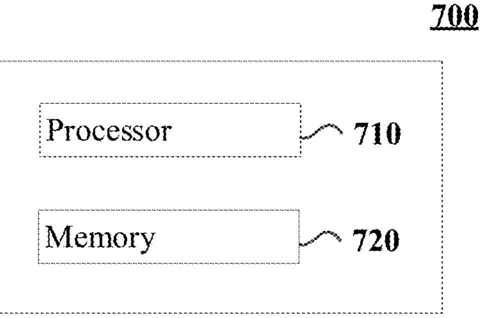
FIG. 7 is an exemplary block diagram illustrating a device for managing metadata of a file system according to an embodiment of the present disclosure.

According to embodiments of the present disclosure, metadata of the file system that is corrupted or damaged may be identified automatically, and may be overwritten with derived reference values without the requirement of a backup of the metadata. In this way, the range of metadata that may be recovered is expanded and the robustness of the file system may be enhanced, thus improving user experience. The method for managing metadata according to embodiments of the present disclosure may be applied to any file system and corresponding metadata in metadata area of the file system. In addition, the method for managing metadata according to embodiments of the present disclosure may be used together with the existing methods for recovering the boot area of the file system, so that not only the boot area but also the metadata area may be recovered or restored. FIG. 7 is an exemplary block diagram illustrating a device 700 for managing metadata of a file system according to an embodiment of the present disclosure. It should be noted that the device 700 depicted in FIG. 7 may be used to perform the operations of managing metadata of a file system, for example, the method 100 as described above.

As shown in FIG. 7, the device 700 can comprise one or more processors 701 and a memory 702. The one or more processors 701 are communicatively coupled with the memory 702 and configured to perform the methods discussed above.

Examples of the one or more processors 701 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The one or more processors 701 can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 702.

The memory 702 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory 702 may reside in the one or more processors 701, external to the one or more processors 701, or distributed across multiple entities including the one or more processors 701. The memory 702 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

In addition, according to another embodiment of the present disclosure, a computer program product for managing metadata of a file system is disclosed. As an example, the computer program product comprises a non-transitory computer readable storage medium having program instructions embodied therewith, and the program instructions are executable by a processor. When executed, the program instructions cause the processor to perform one or more of the described procedures above, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Expression such as "according to", "based on", "dependent on", and so on as used in the disclosure does not mean "according only to", "based only on", or "dependent only on", unless it is explicitly otherwise stated. In other words, such expression generally means "according at least to", "based at least on", or "dependent at least on" in the disclosure.

Any reference in the disclosure to an element using the designation "first", "second" and so forth is not intended to comprehensively limit the number or order of such elements. These expressions may be used in the disclosure as a convenient method for distinguishing two or more units. Thus, a reference to a first unit and a second unit does not imply that only two units may be employed or that the first unit must precede the second unit in some form.

The term "determining" used in the disclosure can include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions may be regarded as "determining".

The terms such as "connected", "coupled" or any of their variants used in the disclosure refer to any connection or combination, direct or indirect, between two or more units, which can include the following situations: between two units that are "connected" or "coupled" with each other, there are one or more intermediate units. The coupling or connection between the units may be physical or logical, or can also be a combination of the two. As used in the disclosure, two units may be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims "including", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure may be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for managing metadata of a file system comprising:

determining a data structure of the metadata based on a type of the file system, wherein the type of the file system comprises a new technology file system (NTFS) or a File Allocation Table 32 (FAT32);

deriving a reference value for a first field of the metadata based on the data structure of the metadata and a protocol of the file system, wherein the protocol of the file system defines predefined values or value ranges for fields of the data structure;

overwriting the first field of the metadata stored on a disk with the reference value in response to an actual value of the first field of the metadata being not equal to the reference value and there being no backup for the metadata, so as to recover the metadata; and wherein overwriting comprises, in response to an actual value of the first field of the metadata being not equal to the reference value and there being a backup for the metadata, overwriting the metadata with the backup, wherein overwriting the metadata with the backup comprises:

in response to a value of a first field of the backup being not equal to the reference value, overwriting the first field of the metadata with the reference value and overwriting the other fields of the metadata with the backup.

2. The method of claim 1, wherein overwriting the metadata with the backup comprises:

overwriting all fields of the metadata with the backup in response to a value of a first field of the backup being equal to the reference value.

3. The method of claim 1, wherein overwriting the metadata with the backup comprises:

overwriting all fields of the metadata with the backup; and in response to a value of a first field of the backup being not equal to the reference value, overwriting the first field of the metadata with the reference value.

4. The method of claim 1, further comprising:

deriving a reference value range for a second field of the metadata based on the data structure of the metadata and the protocol of the file system; and in response to an actual value of the second field of the metadata not falling within the reference value range and there being a backup for the metadata, overwriting the metadata with the backup.

5. The method of claim 1, wherein the file system is the NTFS, the data structure of the metadata comprises a record header and a record body, the record body comprises one or more attributes, and each attribute comprises an attribute header and an attribute body.

6. A device for managing metadata of a file system comprising:

one or more processors;

a memory coupled to at least one of the processors; and a set of computer program instructions stored in the memory, which, in response to execution by at least one of the processors, perform actions of:

determining a data structure of the metadata based on a type of the file system, wherein the type of the file system comprises a new technology file system (NTFS) or a File Allocation Table 32 (FAT32);

deriving a reference value for a first field of the metadata based on the data structure of the metadata and a protocol of the file system, wherein the protocol of the file system defines predefined values or value ranges for fields of the data structure;

overwriting the first field of the metadata stored on a disk with the reference value in response to an actual value of the first field of the metadata being not equal to the reference value and there being no backup for the metadata, so as to recover the metadata; and wherein overwriting comprises overwriting, in response to an actual value of the first field of the metadata being not equal to the reference value and there being a backup for the metadata, the metadata with the backup, wherein overwriting the metadata with the backup comprises, in response to a value of a first field of the backup being not equal to the reference value, overwriting the first field of the metadata with the reference value and overwriting the other fields of the metadata with the backup.

7. The device of claim 6, wherein overwriting the metadata with the backup comprises:

overwriting all fields of the metadata with the backup in response to a value of a first field of the backup being equal to the reference value.

8. The device of claim 6, wherein overwriting the metadata with the backup comprises:

overwriting all fields of the metadata with the backup; and in response to a value of a first field of the backup being not equal to the reference value, overwriting the first field of the metadata with the reference value.

9. The device of claim 6, wherein the set of computer program instructions, when executed by at least one of the processors, are further configured to perform actions of:

deriving a reference value range for a second field of the metadata based on the data structure of the metadata and the protocol of the file system; and in response to an actual value of the second field of the metadata not falling within the reference value range and there being a backup for the metadata, overwriting the metadata with the backup.

10. The device of claim 6, wherein the file system is the NTFS, the data structure of the metadata comprises a record header and a record body, the record body comprises one or more attributes, and each attribute comprises an attribute header and an attribute body.

11. A computer program product for managing metadata of a file system, the computer program product comprising a non-transitory computer readable storage medium having program instructions embodied therewith, the program instructions, in response to execution by a processor, are configured to cause the processor to:

determine a data structure of the metadata based on a type of the file system, wherein the type of the file system comprises a new technology file system (NTFS) or a File Allocation Table 32 (FAT32);

derive a reference value for a first field of the metadata based on the data structure of the metadata and a protocol of the file system, wherein the protocol of the file system defines predefined values or value ranges for fields of the data structure;

overwrite the first field of the metadata stored on a disk with the reference value in response to an actual value of the first field of the metadata being not equal to the reference value and there being no backup for the metadata, so as to recover the metadata; and wherein overwriting comprises overwriting, in response to an actual value of the first field of the metadata being not equal to the reference value and there being a backup for the metadata, the metadata with the backup, wherein overwriting the metadata with the backup comprises, in response to a value of a first field of the backup being not equal to the reference value, overwriting the first field of the metadata with the reference value and overwriting the other fields of the metadata with the backup.

12. The computer program product of claim 11, wherein overwriting the metadata with the backup comprises:

overwriting all fields of the metadata with the backup in response to a value of a first field of the backup being equal to the reference value.

13. The computer program product of claim 11, wherein overwriting the metadata with the backup comprises:

overwriting all fields of the metadata with the backup; and in response to a value of a first field of the backup being not equal to the reference value, overwriting the first field of the metadata with the reference value.

14. The computer program product of claim 11, wherein the program instructions further cause the processor to:

derive a reference value range for a second field of the metadata based on the data structure of the metadata and the protocol of the file system; and in response to an actual value of the second field of the metadata not falling within the reference value range and there being a backup for the metadata, overwrite the metadata with the backup.

* * * * *